United States Patent
Parinov et al.

(10) Patent No.: US 9,990,495 B2
(45) Date of Patent: Jun. 5, 2018

(54) ELIMINATION OF FALSE POSITIVES IN ANTIVIRUS RECORDS

(71) Applicant: AO KASPERSKY LAB, Moscow (RU)

(72) Inventors: Denis I. Parinov, Moscow (RU); Konstantin Y. Sviridov, Moscow (RU); Sergey I. Ulasen, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days. days.

(21) Appl. No.: 15/432,025

(22) Filed: Feb. 14, 2017

(65) Prior Publication Data
US 2018/0032726 A1 Feb. 1, 2018

(30) Foreign Application Priority Data
Jul. 29, 2016 (RU) ................................ 2016131358

(51) Int. Cl.
*G06F 11/00* (2006.01)
*G06F 21/56* (2013.01)

(52) U.S. Cl.
CPC ........ *G06F 21/56* (2013.01); *G06F 2221/033* (2013.01)

(58) Field of Classification Search
CPC ............................ G06F 21/56; G06F 2221/033
USPC ...................................................... 726/22–25
See application file for complete search history.

(56) References Cited

U.S. PATENT DOCUMENTS

| | | | |
|---|---|---|---|
| 7,290,282 B1 | 10/2007 | Renert et al. | |
| 7,467,202 B2 * | 12/2008 | Savchuk | H04L 63/0245 709/224 |
| 7,757,292 B1 | 7/2010 | Renert et al. | |
| 8,028,338 B1 | 9/2011 | Schneider et al. | |
| 8,087,086 B1 | 12/2011 | Lai et al. | |
| 8,312,537 B1 * | 11/2012 | Nachenberg | H04L 63/145 705/64 |

(Continued)

FOREIGN PATENT DOCUMENTS

| | | |
|---|---|---|
| EP | 2597586 | 5/2013 |
| EP | 2790122 | 10/2014 |

(Continued)

OTHER PUBLICATIONS

Subaira et al., "Efficient classification mechanism for network intrusion detection system based on data mining techniques: A survey" 2014 IEEE 8th International Conference on Intelligent Systems and Control (ISCO) Year: 2014 pp. 274-280.*

(Continued)

*Primary Examiner* — Roderick Tolentino
(74) *Attorney, Agent, or Firm* — Patterson Thuente Pedersen, P.A.

(57) ABSTRACT

Systems and methods for managing antivirus records. A method can include providing a data store of antivirus records, providing an antivirus application to be executed on each of a plurality of user computers, and executing instructions by a remote server to implement a processing tool configured to collect an antivirus record parameter for a particular antivirus record and collect statistical data of a detection events associated with the antivirus record, and a processing tool to configured to determine a false activation using the antivirus record parameter and the statistical data.

15 Claims, 9 Drawing Sheets

(56) References Cited

U.S. PATENT DOCUMENTS

| | | |
|---|---|---|
| 8,572,184 B1 | 10/2013 | Cosoi |
| 8,776,229 B1 | 7/2014 | Aziz |
| 8,914,889 B2 | 12/2014 | Niemela |
| 8,966,634 B2 | 2/2015 | Romanenko et al. |
| 9,021,589 B2 | 4/2015 | Anderson et al. |
| 9,288,220 B2 | 3/2016 | Raugas et al. |
| 9,323,928 B2 | 4/2016 | Agarwal et al. |
| 2007/0180528 A1 | 8/2007 | Kane |
| 2009/0300765 A1* | 12/2009 | Moskovitch .......... G06F 21/562 726/24 |
| 2010/0121608 A1* | 5/2010 | Tian .................... G06T 1/005 702/181 |
| 2011/0173698 A1 | 7/2011 | Polyakov et al. |
| 2011/0320816 A1* | 12/2011 | Yao .................... G06F 21/316 713/171 |
| 2012/0084865 A1 | 4/2012 | Niemela |
| 2013/0097704 A1* | 4/2013 | Gavrilut .................. G06F 21/56 726/23 |
| 2013/0139265 A1 | 5/2013 | Romanenko et al. |
| 2015/0106937 A1* | 4/2015 | Jung ....................... H04L 63/18 726/24 |
| 2015/0244733 A1 | 8/2015 | Mohaisen et al. |
| 2016/0154960 A1* | 6/2016 | Sharma ................... G06F 21/56 726/25 |
| 2016/0173516 A1 | 6/2016 | Raugas et al. |
| 2016/0188876 A1* | 6/2016 | Harris ................... G06F 21/554 726/23 |

FOREIGN PATENT DOCUMENTS

| | | |
|---|---|---|
| JP | 2012529690 | 11/2012 |
| WO | WO2007087141 | 8/2007 |

OTHER PUBLICATIONS

Moskovitch et al., "Unknown malcode detection via text categorization and the imbalance problem," 2008 IEEE International Conference on Intelligence and Security Informatics Year: 2008 pp. 156-161.*

* cited by examiner

ELIMINATION OF FALSE POSITIVES IN ANTIVIRUS RECORDS

RELATED APPLICATION

This Application claims the benefit of Russian Application No. 2016131358, filed Jul. 29, 2016, the disclosure of which is incorporated by reference herein.

TECHNICAL FIELD

Embodiments relate generally to antivirus solutions and more particularly to systems and methods for managing antivirus records.

BACKGROUND

Traditionally, one of the tasks of the antivirus industry is to keep antivirus databases up-to-date. In the short time between when a malicious application has been released and when it has been detected, it can be downloaded hundreds of thousands of times by different users and can infect a large number of computers. Therefore, timely updates of antivirus databases allow malicious software to be countered adequately and quickly. However, it should be noted that the amount of software, including malicious software, is constantly growing, which requires proactive methods (heuristic analysis, code emulation, behavior analysis, etc.) for detecting such applications. To counter unknown malicious applications, antivirus providers have used heuristic detection methods, execution of unknown applications in protected environments (sandbox, honeypot) using virtualization, as well as various methods that limit the functionality of applications based on the analysis of their activity, for example, using a Host-based Intrusion Prevention System (HIPS).

However, all of the aforementioned methods have deficiencies, due to both the specifics of their operation and their use in antivirus applications wherein the user may apply settings which inhibits full use of these technologies. For example, in a situation where an unknown application is launched, a significant amount of processor time and computer resources are needed to validate the unknown application. Often, prior to the check of the unknown application, the user will disable its execution in a protected environment (e.g. on a virtual machine) or reduce the time allocated for emulation in order to utilize those resources for other computing tasks.

Due to possible risks of inefficient operation of the aforementioned proactive technologies and due to constant increase of the number of malicious applications, so-called whitelists (databases of clean files) are becoming more and more popular. Whitelists are created for objects such as files, applications, links, email address owners, as well as for user accounts in instant messaging systems, messaging logs, IP addresses, host names, domain names, and so on. Such lists can be built based on many factors. For example, the presence of electronic digital signature or other manufacturer data, data about the source (where the application was received from), data about the application relationships (e.g. parent-child relationship), data about the application version (for example, the application can be considered verified based on the fact that the previous version was also in the whitelist), data about environment variables (operating system, launch parameters), etc. can all be utilized.

Before each release to updates of signatures for antivirus databases, the release must be checked for possible overlap with the whitelist of files. Currently, the majority of unknown executable files being investigated are so-called PE files (Portable Executable files) which have a PE format (for the Windows operating system family—the operating system that has induced a majority of malicious software). A PE file includes a heading, various sections that constitute an image of the executable application, and an overlay, which comprises the segment that is additionally loaded if needed during execution.

Various parts of a file can be used to create a signature for a file. Most often, a code segment is used to create a signature. However, situations often occur when an expert erroneously interprets a library code or another widely used code segment as part of a malicious one, because this fragment is present in the malicious application. In such a case, a signature is thus erroneously created that contains a file fragment that can be present in a large number of clean files (for example, a fragment of a dynamic library). This signature can be successfully detected in a malicious application, but also in clean files that contain the code segment. In such situations, the use of the signature causes a false activation, because it is detected in a clean file.

The rules, templates, lists, signatures, (often created by an expert), etc. that are used by antivirus applications all constitute antivirus records. Such antivirus records allow for the detection and removal of malicious software. However, generation of antivirus records often include human error, such as expert making a mistake by creating, for example, a signature that considers clean software, specified in the whitelist of files, to be malicious. Further, other sources of error besides experts are included. For example, systems for the automatic building of antivirus records, when trying to detect as much malicious software as possible, inevitably include some clean applications as well. Situations can arise where certain (non-malicious) software required by a user is blocked by the antivirus application that uses the erroneous antivirus records. As a result, the user might be frustrated and might question the particular antivirus application.

Therefore, the tasks of timely detection and elimination of false activations are important for the antivirus industry. Today, various approaches are known that allow the reduction of the number of false activations. For example, International Application Pub. No. WO2007087141 describes a method for reducing the number of false activations. Methods described include multiple checks, first using a list of malicious files, then using a list of clean files. However, the disclosed methods do not allow for the detection of false activations for antivirus records not contained in the list of malicious files or in the list of clean files. Therefore, existing technologies are inefficient and in some cases, unworkable to find false activations.

SUMMARY

In an embodiment, a method for managing antivirus records comprises providing a data store of antivirus records; providing an antivirus application to be executed on each of a plurality of user computers, each antivirus application configured to access the data store and at least one antivirus record, wherein the antivirus application is further configured to detect a malicious software file for antivirus records having a test status and detect and contain a malicious software file for antivirus records having a working status; and executing instructions by a remote server, the remote server including computing hardware of at least one processor, a memory operably coupled to the at least one processor and configured to store instructions invoked by the at least one processor, an operating system implemented on the computing hardware, and input/output facilities, cause the remote server to implement: a processing tool configured to: collect at least one antivirus record parameter for a particular antivirus record from the plurality of user computers, the antivirus record having a working status after occurrence of the detection event of the antivirus record on one of the plurality of user computers, wherein each of the detection event is associated with mentioned antivirus record, collect statistical data of the detection events of the antivirus record from the plurality of user computers, and determine whether a total number of user computers on which the detection event of the antivirus record occurred over a predetermined period of time exceeds an detection threshold, and a classification tool configured to: determine, if the total number of user computers on which the detection event of the antivirus record occurred exceeds the detection threshold, whether the antivirus record contains a false activation by at least one classification algorithm using the at least one antivirus record parameter and statistical data of the detection event, and change the status of the antivirus record from working status to test status, wherein the processing tool is further configured to receive the changed status of the antivirus record from the classification tool and distribute the changed status to the data store.

In an embodiment, a system for managing antivirus records comprises a data store of antivirus records; and a remote server including computing hardware of at least one processor, a memory operably coupled to the at least one processor and configured to store instructions invoked by the at least one processor, an operating system implemented on the computing hardware, and input/output facilities, wherein the remote server is configured to implement: a processing tool configured to: collect at least one antivirus record parameter for a particular antivirus record from a plurality of user computers, each of the plurality of user computers executing an antivirus application, wherein the antivirus application is configured to access the data store and at least one antivirus record, wherein the antivirus application is further configured to detect a malicious software file for antivirus records having a test status and detect and contain a malicious software file for antivirus records having a working status, the antivirus record having a working status after occurrence of the detection event of the antivirus record on one of the plurality of user computers, wherein each of the detection event is associated with mentioned antivirus record, collect statistical data of the detection events of the antivirus record from the plurality of user computers, and determine whether a total number of user computers on which the detection event of the antivirus record occurred over a predetermined period of time exceeds an detection threshold, and a classification tool configured to: determine, if the total number of user computers on which the detection event of the antivirus record occurred exceeds the detection threshold, whether the antivirus record contains a false activation by at least one classification algorithm using the at least one antivirus record parameter and statistical data of the detection event, and change the status of the antivirus record from working status to test status, wherein the processing tool is further configured to receive the changed status of the antivirus record from the classification tool and distribute the changed status to the data store.

In an embodiment, a method for managing antivirus records comprises gathering at least one antivirus record parameter for a particular antivirus record utilized on a user device, the antivirus record being utilized to detect a malicious software file for antivirus records having a test status and detect and contain a malicious software file for antivirus records having a working status; gathering at least one statistical measure after the occurrence of a malicious software file detection event on the user device for a particular antivirus record, the malicious software file detection event activating the antivirus record; determining a total number of user devices on which the antivirus record was activated; determining whether the total number of user devices on which the antivirus record was activated exceeds a predetermined device threshold; determining, if the total number of user devices exceeds the device threshold, whether the antivirus record contains a false activation by a classification algorithm that utilizes the at least one antivirus record parameter and the at least one statistical measure; and updating the status of the antivirus record from working status to test status if the classification algorithm determines the antivirus record contains a false activation.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
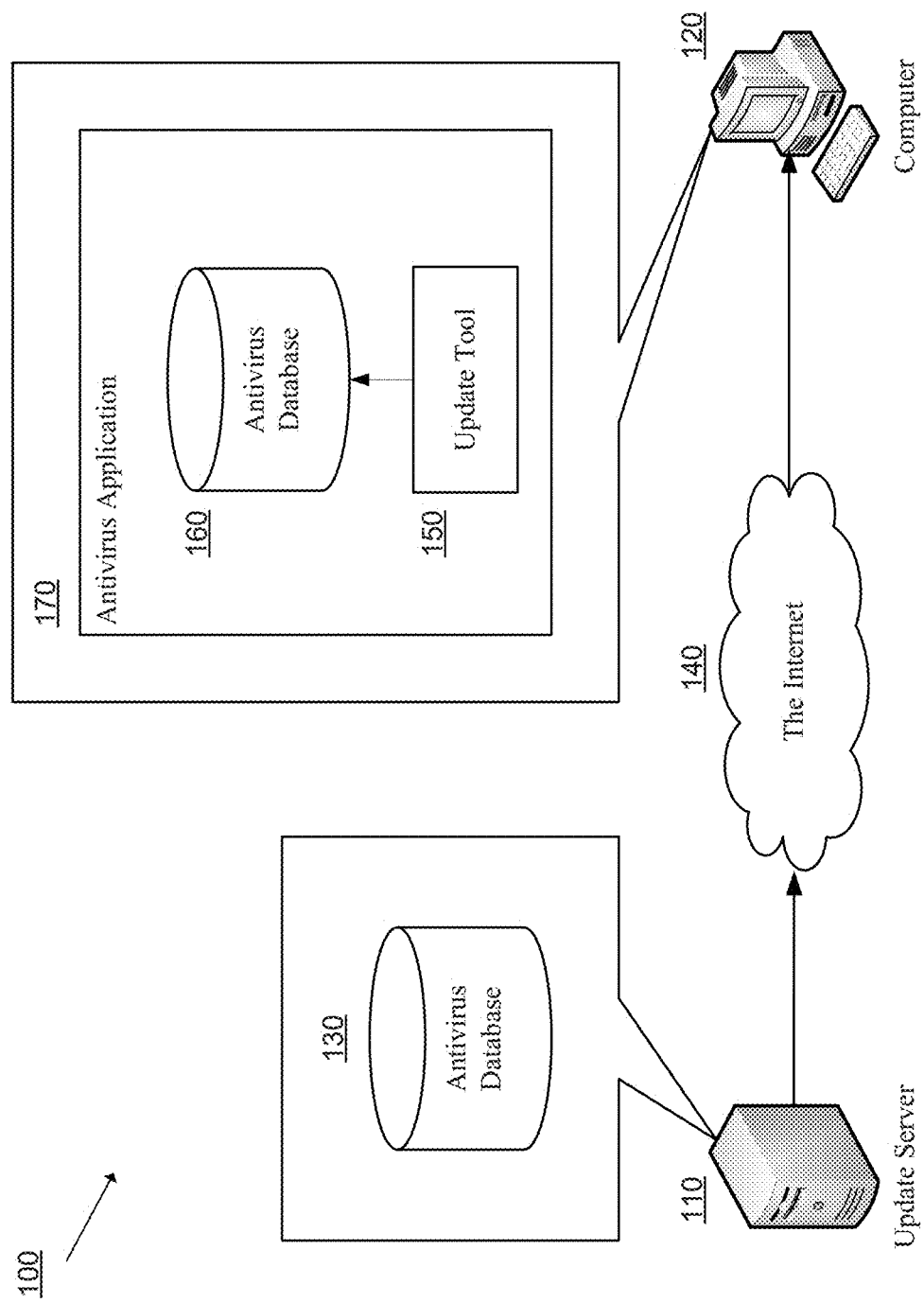
FIG. 1 is a block diagram of a system for updating antivirus records on an antivirus database, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a block diagram of a system 100 for updating antivirus records on an antivirus database 160 is depicted, according to an embodiment. System 100 generally comprises an update server 110 communicatively coupled to a user computer 120 via a network 140. As depicted in FIG. 1, network 140 comprises the Internet.

For example, antivirus databases updates are sent from update server 110 using Internet network 140 to computer 120 with an installed antivirus application 170. Update server 110 contains a constantly replenished antivirus database 130. In embodiments, an antivirus company has the means for updating antivirus database 130. Thus, the antivirus company constantly produces new antivirus records of various types (for example, signatures, heuristics, parental controls, and other objects), which can be produced in two statuses—either pre-verified and working antivirus records, or test antivirus records.

Accordingly, antivirus database 130 contains both verified working records and test records. Working antivirus records (signatures, heuristics, etc.) are different from test records in that, in case of activation (detection) of a working record, the user will be notified of this event, and/or antivirus application 170 is configured to remove or cure the malicious content of a file. If the record is a test record, the user will not be notified, and no action will be taken to remove malicious content. Therefore, a working record means an antivirus record with the "working" status, while a test record hereinafter means an antivirus record with the "test" status. Activation of an antivirus record hereinafter means that a file was found to be malicious by an antivirus application using an antivirus record (for example, detecting a code segment signature in a file). In embodiments, a "file" can comprise any sequence of bytes stored on a drive of user computer 120, such as applications, links, email messages, as well as accounts of users of instant messaging systems, messaging logs, IP addresses, host names, domain names, and so on.

In an embodiment, antivirus application 170 initiates actions for the removal of malicious content of a file for an activated antivirus record having a "working" status. Such actions can be, for example, a single action or multiple actions: removal of the file, moving of the file to the quarantine folder, user notification, or modification of the malicious part of code. In another embodiment, antivirus application 170 stops taking actions for removal of the malicious content of the file for the activated antivirus record, if the antivirus record status has changed from "working" to "test". In yet another embodiment, the user assigns a list of actions antivirus application 170 can perform when working and test antivirus records are activated. System 100 is not limited to the use of antivirus records with only "working" or "test". One skilled in the art will appreciate that any number of such statuses can be implemented in embodiments.

In operation, antivirus application 170 periodically checks update server 110 for updates to antivirus database 130. If database 130 was updated, antivirus application 170 receives new antivirus records through Internet network 140 from update server 110. On computer 120, an antivirus application 170 is installed, which contains an update tool 150, to which the records are sent from antivirus database 130. Antivirus application 170 has its own antivirus database 160, which likewise contains both working records and test records. Antivirus database 160 can be used by one of the security modules of antivirus application 170—it can be a signature check module, an emulator, a heuristic check tool, etc. New records from antivirus database 130, both with the "working" status and with the "test" status, are sent by update tool 150 to antivirus database 160.

In an embodiment, each antivirus record in antivirus database 160 has a unique ID. Each antivirus record allows for the detection of one or more malicious files that have a calculated hash sum (for example, SHA-3, SHA-2, SHA-1, MD5, etc.). In an embodiment, the relation between the unique ID of the antivirus record and the hash sum of the files is "many-to-many". For example, one record with a unique ID can correspond to multiple hash sums. In other embodiments, one hash sum can correspond to multiple records. This can happen, for example, when an individual record with a unique ID was applied to a specific hash sum, and a new record is created, allowing for the detection of a whole family of similar malicious programs. In embodiments, the process of updating antivirus records can occur for a preset interval (for example, every hour).

System 100 demonstrates the urgency in accurately and efficiently managing antivirus records. For example, if an antivirus record causes antivirus application 170 to consider a non-malicious file to be malicious, such event is called a false activation and causes a false user notification or a false action taken for the detected file by antivirus application 170. During the period before the next antivirus update when such a mistake can be corrected, a false activation can occur on many computers 120, and a large number of users will be notified of the detection of a clean file as a malicious one. Embodiments therefore offer timely detection of antivirus records with false activation; in particular, to change antivirus record status from "working" to "test" before the release and distribution of the main update of antivirus databases. In such a case, the user will not receive false notifications, and antivirus application 170 will not take actions for removal of malicious content of a file which is actually clean. Further in embodiments, the antivirus supplier will have enough time to correct the detected antivirus records. If the use of the antivirus record does not cause a false activation, its status will be changed back from "test" to "working".

Figure 2:
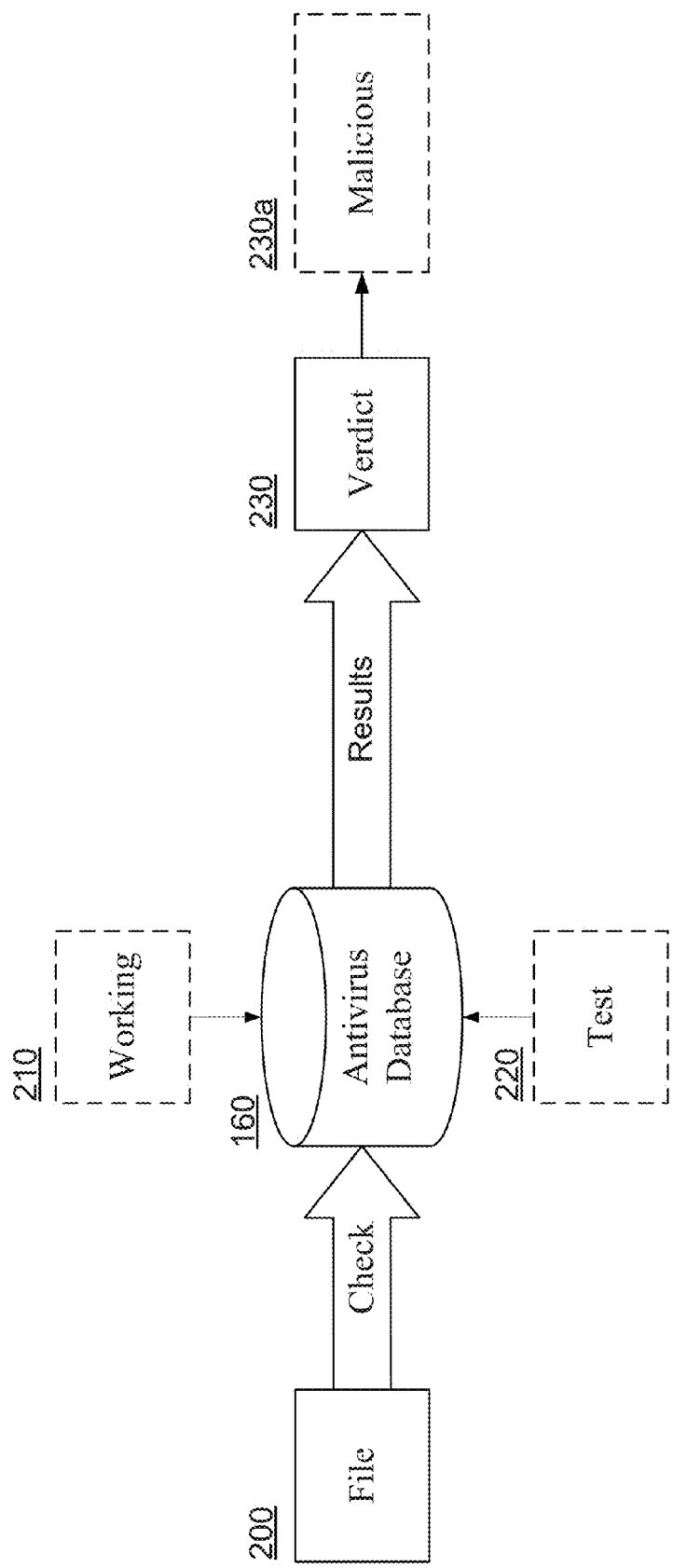
FIG. 2 is a flowchart of an antivirus check using an antivirus database, according to an embodiment.

Referring to FIG. 2, a flowchart of an antivirus check using an antivirus database is depicted, according to an embodiment. For example, antivirus application 170, installed on computer 120, uses antivirus databases 160 to perform antivirus tasks. Antivirus database 160 contains working antivirus records 210 and test antivirus records 220. In embodiments, each antivirus record has its own unique ID. Each record from antivirus database 160 is responsible for a verdict 230 based on the check results. During the antivirus check of file 200, antivirus application 170 can use a record from antivirus database 160. On the basis of the verdict 230, a decision is made to include file 200 in a set of malicious files 230*a* based on the check. Therefore, an "activated" antivirus record can mean a detected antivirus record to which file 200 corresponds. However, certain records and verdicts are incorrect due to the problem of false activation (such as an antivirus record that includes the file 200 in the set of malicious files 230*a*, although file 200 is not malicious). Embodiments therefore can determine the current status of the activated record to quickly correct non-current statuses.

Figure 3:
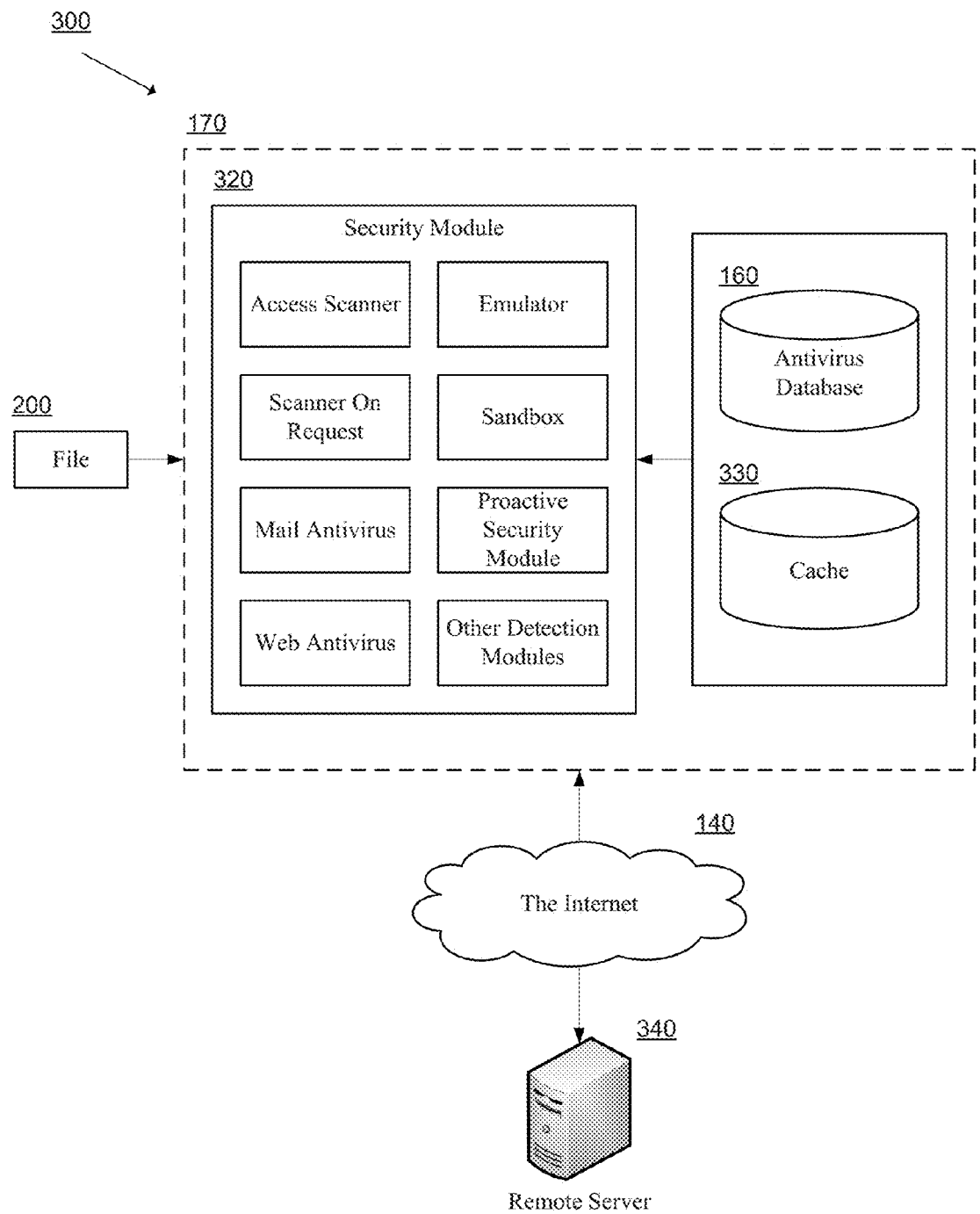
FIG. 3 is a block diagram of a system for protecting against malicious software, according to an embodiment.

Referring to FIG. 3, a block diagram of a system 300 for protecting against malicious software is depicted, according to an embodiment. System 300 generally comprises antivirus application 170 and a remote server 340 which are communicatively coupled via a network such as the Internet 140.

Antivirus application 170 comprises a plurality of security modules 320, which each provide for the detection and, in certain cases, removal or containment of malicious software. Malicious software can be in, for example, file 200 as depicted in FIG. 3. Antivirus application 170 includes its own antivirus database 160, which contains both working records 210 and test records 220. Each of security modules 320 can interface with antivirus database 160 and appropriate antivirus records.

For example, during an antivirus check of file 200, a security module from the plurality security modules 320 can use records from antivirus database 160. Such records are, for example, signatures, heuristics, parental control policies, and so on. It should be noted that not all security modules from the plurality of security modules 320 use the same records. Depending on the type of file 200, a corresponding suitable security module 320 is utilized. In another embodiment, two or more security modules 320 can jointly check file 200. A security module 320 can use either a working record 210 or a test record 220 for the antivirus check of file 200. Security module 320 can comprise an on-access scanner, an on-demand scanner, a mail antivirus module, a web antivirus module, an emulator, a sandbox, a proactive security module, and other detection modules.

In embodiments as depicted in FIG. 3, antivirus application 170 can include a cache 330 configured to store corrections of antivirus records, if such corrections are provided by an antivirus provider or antivirus supplier. In an embodiment, corrections (for example, corrected records or record statuses), contained in cache 330, have a higher priority than records with the same ID from antivirus database 160. If, during the antivirus check of file 200 by a security module 320, there is a possibility of using the antivirus record from antivirus database 160 or an antivirus record with the same ID from cache 330, security module 320 will choose the antivirus record from cache 330. In case of activation of an antivirus record, either a working one or a test one, the information about the activated record is sent to remote server 340, which can check whether the status of the activated record is current.

Embodiments therefore further include methods for managing antivirus records. For example, methods for checking whether the status of an antivirus record is current are considered. Remote server 340, which can be located on Internet network 140 at the antivirus supplier, can receive statistical information on the activated antivirus records and on files 200 detected by these records from multiple computers 120, each of which can execute antivirus application 170. Communication between antivirus application 170 and remote server 340 is maintained using Internet network 140. If, during the operation of a security module 320, an antivirus record from antivirus database 160 was activated, security module 320 sends a request to remote server 340 in order to check whether the status of the activated record is current. In embodiments, the request is sent before issuing a notification of malicious file detection in accordance with an activated record having a "working" status. If the reply to the request confirms that the status of the activated record is current, a notification of maliciousness results (if indeed, malicious code is detected), as well as further actions intended to remove the malicious content of file 200. In other embodiments, if the reply to the request notes that the status of the activated record is out-of-date, the reply from remote server 340 to the request by security module 320 can contain the changed status of the antivirus record, for example, from "working" to "test." In such a case, no user notification and no neutralization of the file 200 will follow.

Figure 4:
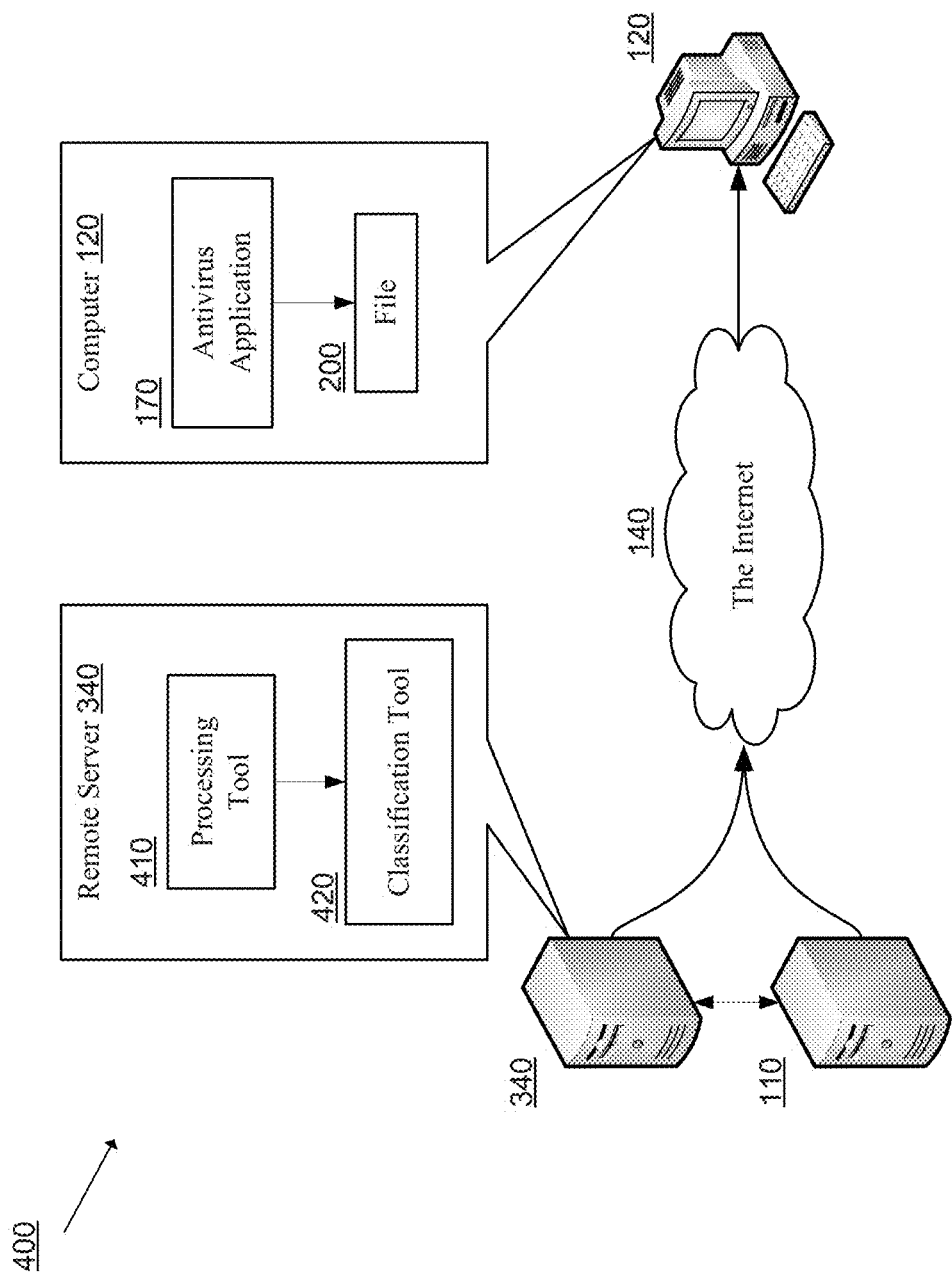
FIG. 4 is a block diagram of a system for managing antivirus records, according to an embodiment.

Referring to FIG. 4, a block diagram of a system 400 for managing antivirus records is depicted, according to an embodiment. In particular, system 400 is configured to manage antivirus records on various user computers by checking for a current antivirus record status and changing the status if necessary. For ease of understanding, the following description is provided based on the control of a single antivirus record. However, the system is plainly scalable and applicable for controlling any number of antivirus records. System 400 generally comprises a remote server 340 and a user computer 120.

Remote server 340 includes a processing tool 410 configured to process antivirus record data and a classification tool 420 configured to classify antivirus record data. In an embodiment, upon activation of an antivirus record on computer 120, data about the activated antivirus record is sent to remote server 340. In an embodiment, the data sent includes parameters of the antivirus record, such as: date and time of the activation of the antivirus record; name of the file for which the antivirus record was activated; path to the file for which the antivirus record was activated; type of the antivirus record (for example, signature, heuristics, parental control tool, etc.); type of the user application; or region of the user computer location.

Figure 6:
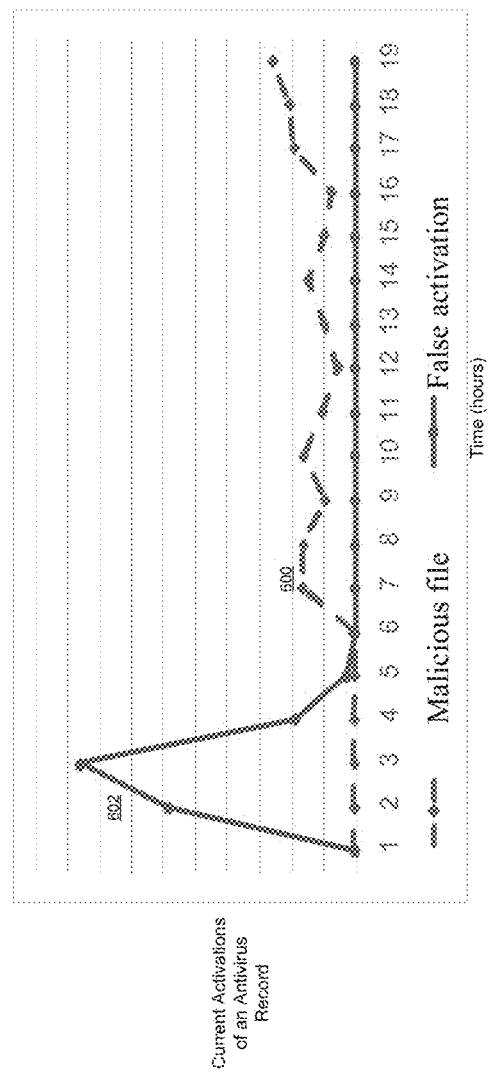
FIG. 6 is a graph of current activations of an antivirus record against time, according to an embodiment.
Figure 7:
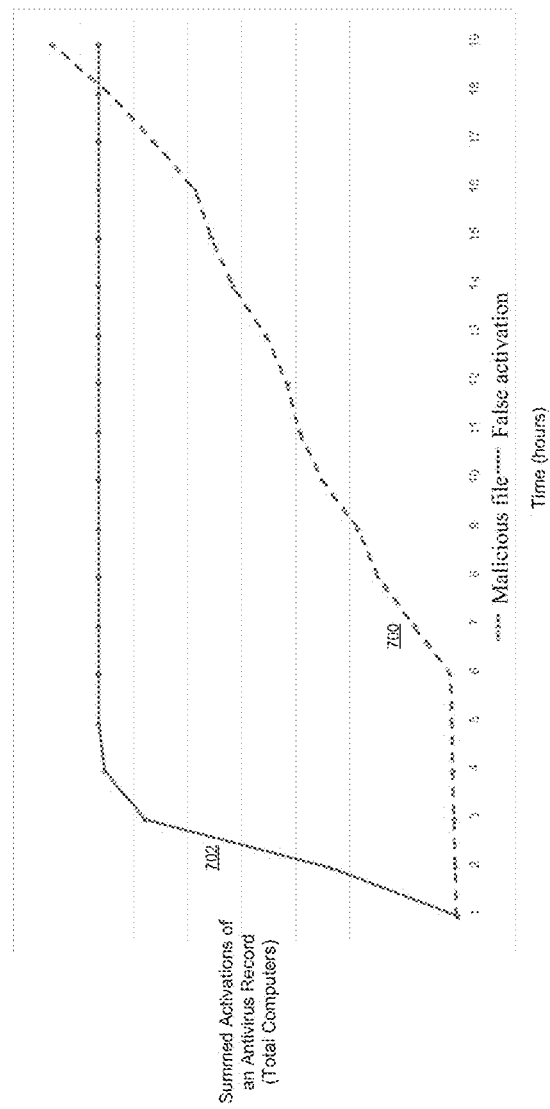
FIG. 7 is a graph of the total activations for an antivirus record against time, according to an embodiment.

Processing tool 410 is configured to collect parameters of antivirus records. In an embodiment, processing tool 410 can collect parameter data for a preset time (for example, 12 hours). In embodiments, only parameters of antivirus records having a "working" status (activated on the computer 120) are collected. In other embodiments, parameters of antivirus records having a "test" status are collected. Though not activated, such records can include previously-activated parameter data. Processing tool 410 is further configured to generate or gather statistics of antivirus record activation. For example, activation statistics can include the time dependence of the number of computers 120 on which the antivirus record was activated. Such dependence can be shown as a graph in a rectangular coordinate system, where the X axis represents time and the Y axis represents the number of computers on which the antivirus record was activated. For example, FIG. 6 is a graph of current activations of an antivirus record against time, according to an embodiment. FIG. 7 is a graph of the total activations for an antivirus record against time, according to an embodiment.

If an antivirus record contains a false activation, i.e. if it corresponds to a clean file, then, within a short time (for example, a few hours) after the antivirus record was sent to computers 120, the antivirus record will be activated on all computers 120 that have the clean file. Processing tool 410 is configured to determine the total number of computers 120 on which the antivirus record was activated. Therefore, if the determined total number of computers 120 is sufficiently large (for example, 10,000 computers), the antivirus record was probably activated for a clean file, i.e. it contains a false activation. However, activation of the antivirus record on a large number of computers within a short period of time can sometimes be also typical for malicious software, which may be widespread, especially if there was an epidemic of infection with new malicious software. Therefore, additional analysis is often required.

In embodiments, processing tool 410 can further change the threshold value depending on the antivirus record type. In an example, the threshold can be 10,000 activations for signatures, while for heuristics, the threshold can be 20,000 activations. Processing tool 410 is further configured to change the threshold value depending on the number of the activated antivirus records. For example, if most antivirus records are activated more often, the threshold can be increased, for example, from 10,000 to 15,000, in order to reduce the load on the computing resources of antivirus provider servers.

Classification tool 420 is communicatively coupled with processing tool 410 and is configured to classify antivirus records. In an embodiment, an antivirus record that includes a false activation belongs to a first class and an antivirus record that identifies a malicious file belongs to a second class.

Classification tool 420 is configured to determine whether an antivirus record belongs to the first class of antivirus records that contain false activation. In embodiments, a classification algorithm using antivirus record parameters and statistics of antivirus record activation can be utilized. For example, an initial evaluation can determine whether the total number of user computers exceeds a preset threshold value (e.g., 10,000). In an embodiment, the preset threshold value can be determined using antivirus record parameters such as the date and time of antivirus record activation, and the name and path of the file. Subsequently, additional analysis can be conducted by the classification algorithm.

In an embodiment, classification tool 420 uses at least one of the following classification algorithms: a support vector machine, a Bayesian classifier, a neural network, or a logistic regression. In an embodiment, the antivirus record is the classification object, one or multiple parameters of the antivirus record are the classification attributes, and the classification algorithm determines the classification of the object according to one of the two classes. In an embodiment, the first class additionally includes an antivirus record which contains a trusted file. In such embodiments, because an antivirus record detects a false activation (i.e. detects a clean file), the file is deemed to erroneously found malicious by an antivirus analyst or by an automatic system for creation of antivirus records. Therefore, trusted files and files for which an antivirus record contains a false activation are put in the same class.

After it is determined that the antivirus record likely belongs to a class of antivirus records containing false activation (due to, for example, the activation threshold and classification algorithm), classification tool 420 changes the status of the antivirus record from "working" to "test."

In an embodiment, an additional attribute of the classification object is represented by at least one of the statistical functions for a sample from the number of users with which the antivirus record was activated. For example, statistical functions can include: moments, sample moments, autocorrelation coefficients, a trend, a distribution law, or the presence of a seasonal component and a seasonal component period.

In one embodiment, classification tool 420 is configured to build a classification algorithm using a training set. For example, processing tool 410 can build a training set from the antivirus records for which the division into two classes is known in advance. Each antivirus record from the training set is assigned a "test" status. After the sample is built, processing tool 410 sends it to computers 120 and gathers the parameters of the activated antivirus records from the training set and the antivirus record activation statistics for a preset time. In an embodiment, time is counted from the moment the antivirus record is sent to user computers 120. The activation statistics can include the time dependence of the number of computers 120 on which the antivirus record was activated. As a result, the training set is supplemented with the gathered parameters of the activated antivirus records, excluding from the training set those antivirus records which were not activated during the gathering of statistics. An example classification algorithm is provided below with respect to FIG. 8. In embodiments, different training sets can be built for different user computer location regions. Consequently, the classification algorithms for different regions can have different attribute values.

In embodiments, different weightings can be given to applications of different types as part of the statistics or algorithms considered. Weight can be taken into account when calculating the number of user computers 120 having a detected antivirus record against a preset threshold. For example, an antivirus supplier can produce three antivirus applications—a basic antivirus with a basic functionality set, an antivirus with a maximal functionality, and a corporate antivirus with administration tools. Weights can be assigned as follows: the basic antivirus weight is 1, the maximal functionality antivirus weight is 2, and the corporate antivirus weight is 3. The activation of an antivirus record on a computer 120, on which a maximal functionality antivirus is installed, is considered equal to the activation of the same antivirus record on two computers on which a basic antivirus is installed, because a computer where a maximum functionality antivirus is installed is less susceptible to infection by malicious software, and, consequently, the activation of an antivirus record on it has a greater weight when false activations are identified. The activation of an antivirus record on a computer on which a corporate antivirus is installed is considered equal to the activation of the same antivirus record on three computers on which a basic antivirus is installed.

In further embodiments, different weightings can be given to different types of antivirus records, which can also be considered when calculating the number of user computers having the detected antivirus record against a preset threshold. For example, in an activation of an antivirus record using a security module 320 comprising an on-access scanner, the weight can equal 1. In another embodiment, in an activation of an antivirus record for a file using a security module 320 comprising a sandbox, the weight can equal 2. In embodiments, the antivirus record type can depend on the security module 320 designed to use the antivirus record (for example, signature, heuristic, parental control tool, and other objects).

Multiple antivirus records of different types can correspond to file 200, in embodiments. This can happen if file 200 is simultaneously detected by multiple security modules 320; for example, an emulator and an on-access scanner. In this example, the probability of a false activation decreases, because the probability of error of multiple security modules 320 at the same time is lower than the probability that the error will occur in one security module 320. Therefore, the weight of the antivirus record of each type that was activated on file 200 can be reduced.

Figure 5:
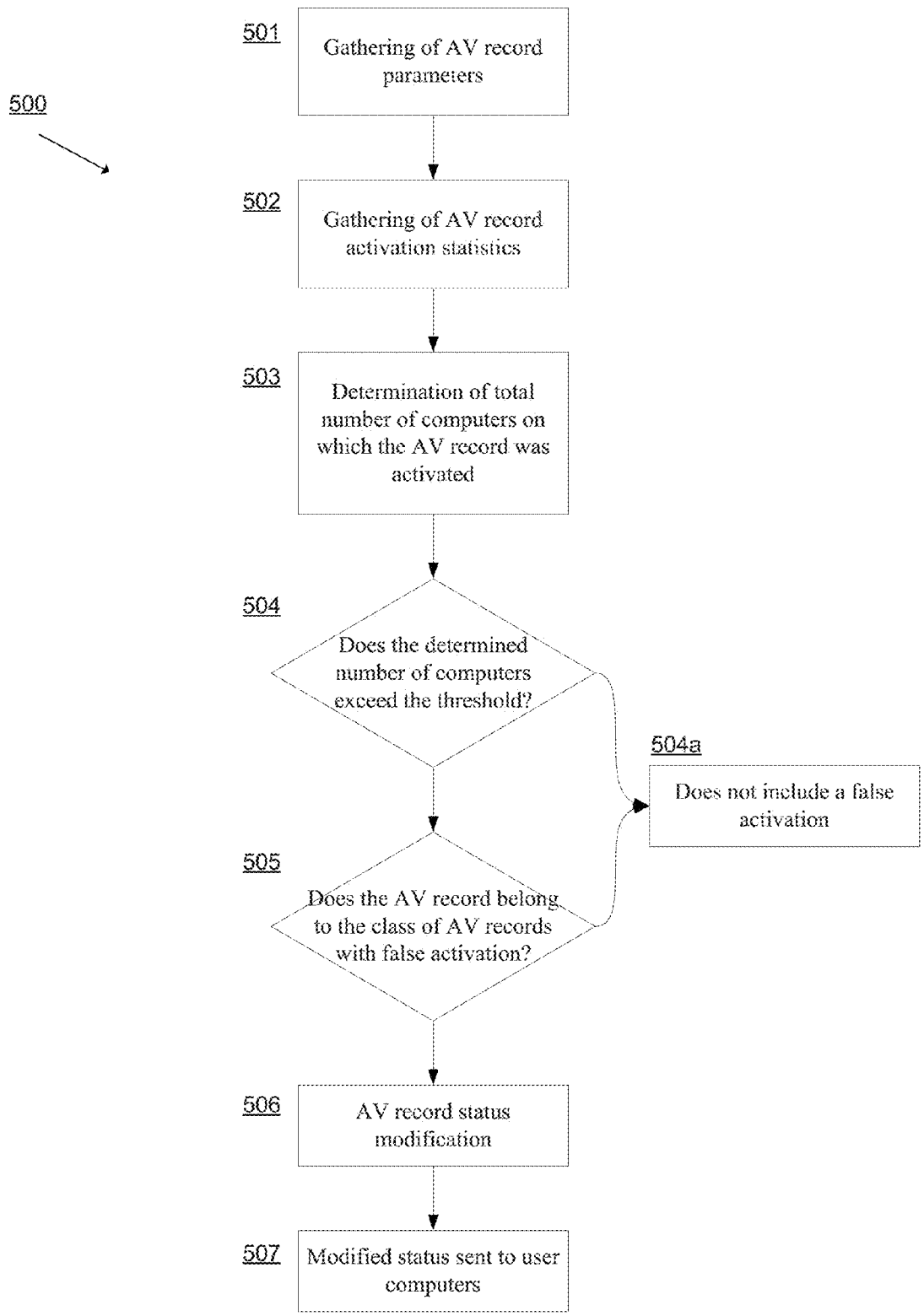
FIG. 5 is a flowchart of a method for managing antivirus records, according to an embodiment.

Referring to FIG. 5, a flowchart of a method 500 for managing antivirus records is depicted, according to an embodiment. As described above with respect to FIGS. 3-4, for example, an antivirus record (either working or test) can be activated on a computer 120.

At 501, information about the activated antivirus record is gathered. For example, remote server 340, using processing tool 410 can gather antivirus record parameters. In embodiments, parameters are gathered during a preset time for antivirus records having a "working" status, (when activated on computers 120).

At 502, processing tool 410 gathers statistics of activation of the antivirus record. In an embodiment, the statistics of activation can include the time dependence of the number of computers 120 on which the antivirus record was activated.

At 503, processing tool 410 determines the total number of computers on which the antivirus record was activated. In an embodiment, the number of computers is determined for the time during which processing tool 410 gathers antivirus record parameters. Such dependence can be shown as a graph in a rectangular coordinate system, where the X axis represents time and the Y axis represents the number of computers on which the antivirus record was activated. As described above, examples of time dependence graphs are depicted in FIGS. 6-7.

At 504, processing tool 410 checks whether the determined total number of computers 120 exceeds a preset threshold value (for example, 10,000). If the threshold value is exceeded, then, at 505, classification tool 420, determines whether the item belongs to a class of antivirus records that include a false activation. In an embodiment, classification tool 420 implements a classification algorithm using antivirus record parameters and antivirus record activation statistics.

In another embodiment, at 504, processing tool 410 uses antivirus record parameters (for example, antivirus record activation date and time) to determine the number of user computers on which antivirus records were activated during the preset time. In this case, the file corresponding to the antivirus record is determined by suitable antivirus record parameters, such as file name, file path, or a hash sum of the file. In one embodiment, the preset time is calculated from the moment the corresponding antivirus record is sent to one or multiple users of antivirus application 170.

If the threshold value was not exceeded, the method ends at 504a. Method 500 thus considers that antivirus record does not include a false activation. If, at 505, method 500 determines that the antivirus record does not belong to a class of antivirus records containing false activation, the method likewise ends at 504a, and it is considered that the antivirus record does not include a false activation. An example of antivirus record classification is provided below with respect to FIG. 8.

In an embodiment, at 505, at least one of the following classification algorithms can be used: a support vector machine, a Bayesian classifier, a neural network, or a logistic regression. In embodiments described herein, the antivirus record is the classification object, one or multiple parameters of the antivirus record comprise the classification attributes, and the classification algorithm determines to which of the two classes the classification object belongs. An antivirus record that includes a false activation belongs to a first class, and an antivirus record that identifies a malicious file belongs to a second class. In another embodiment, an antivirus record that identifies a trusted file is additionally attributed to the first class. In yet another individual embodiment, an additional attribute of the classification object is comprises at least one of the statistical functions for a sample from the number of users or number of computers with which the above-mentioned antivirus record was activated. Statistical functions can be, for example: moments, sample moments, a trend, a distribution law, the presence of a seasonal component or a seasonal component period.

In an embodiment, the classification algorithm used by method 500 is built and calibrated using a training set. Initially, a training set is built from antivirus records for which a division into two classes is already known. Each antivirus record from the training set is assigned a "test" status and is sent to a group of computers 120. Such group can include two or more computers 120 having an antivirus application 170 installed. Once the training set is communicated to computers 120, processing tool 410, gathers parameters of activated antivirus records from the training set and the activation statistics of the activated antivirus records. In an embodiment, parameters are gathered by processing tool 410 for a preset time (for example, 24 hours). The antivirus records not activated at any computer 120 during the preset time are excluded from the training set, and the gathered parameters of the remaining antivirus records can be saved together with those records.

At 506, classification tool 420 changes the status of the antivirus record from "working" to "test" and communicates the change in status to processing tool 410. At 507, processing tool 410 communicates the changed status of the antivirus record to the respective antivirus applications 170 on user computers 120. Therefore, false activations are reduced at each of computers 120.

Referring to FIG. 6, a graph of activations of current antivirus record against time is depicted, according to an embodiment. In particular, FIG. 6 illustrates the time dependence of the number of computers 120 on which an antivirus record is activated. In this example, the number of computers 120 is calculated at every hour. Depicted in FIG. 6 are both the current activation statistics of an antivirus record having a false activation 600 and for an antivirus record corresponding to a malicious file 602. For comparison purposes, FIG. 7 depicts a graph of the total activations for an antivirus record against time, according to an embodiment. FIG. 7 therefore shows the dynamics of the change in time of the total number of computers 120 on which an antivirus record was activated, corresponding to the graph of current activations over time shown in FIG. 6. Thus, antivirus records that correspond to false activation 702 and antivirus records that identify a malicious file 700 have different dynamics of activation on computers 120. For example, for an antivirus record including a false activation 702, the largest number of activations on computers 120 occur in the first five hours after the record is created and sent to computers 120. However, an antivirus record for a malicious file 700 is activated on a limited number of user computers 120 in the first six hours, but the number of activations substantially increases thereafter.

Thus, by using classification algorithms, on the basis of activation statistics of antivirus records for known false activations and malicious files, it is possible to select parameters of the classification algorithm that classify each new antivirus record to one of two classes—antivirus records for malicious files or antivirus records that include a false activation. Classification can be made to high probabilities. In an embodiment, the classification object is the antivirus record, and the classification object attribute is one or more parameters of the antivirus record, and can include statistical functions such as moments, sample moments, autocorrelation coefficients, a trend, a distribution law, the presence of a seasonal component or a seasonal component period.

Figure 8:
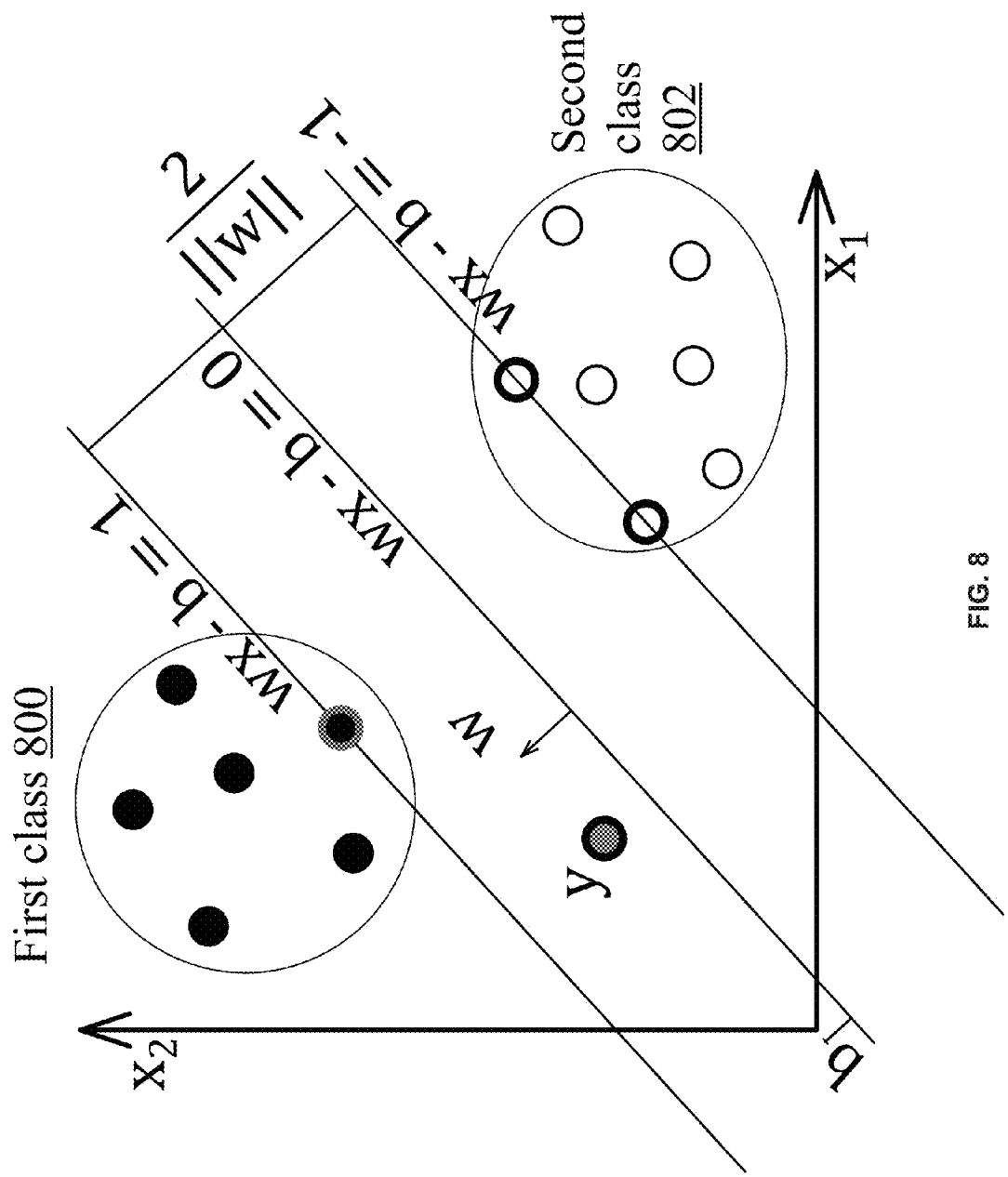
FIG. 8 is a graph of antivirus record classification using a dividing hyperplane, according to an embodiment.

Referring to FIG. 8, a graph of antivirus record classification using a dividing hyperplane is depicted, according to an embodiment. For example, embodiments can utilize classification algorithms according to support vector machine (SVM) methods. Algorithms can be based on supervised learning and the linear division of classification objects in attribute space using a hyperplane. In embodiments, antivirus records can be classified into one of two classes. An antivirus record that includes a false activation can belong to a first class 800 and an antivirus record that identifies a malicious file can belong to a second class 802.

Classification objects (for example, antivirus records) can be expressed as follows: where $(x_i, c_i)$, where $c_i$ becomes "1" if the classification object identified by the attribute vector $x_i$ belongs to the first class, and becomes "−1" if the object belongs to the second class. In this case, the objects $i=\overline{1,n}$, where n represents the number of objects. FIG. 8 illustrates first class objects as solid circles (for example, antivirus records that include a false activation), and second class objects as hollow circles (for example, antivirus records that identify malicious files). The objects shown are viewed as a training set. The support vector machine is configured to build a dividing hyperplane intended to be as far from the points of both classes that are nearest to the hyperplane as possible. Such a dividing hyperplane is called optimal and is defined in vector form: wx−b=0, where wx is the dot product of vectors w and x, and b is a parameter. Hyperplanes can then be selected that intersect support vectors of two classes and are parallel to the optimal dividing hyperplane: wx−b=1, wx−b=−1. In the case where the training set is linearly separable, hyperplanes are selected so that there are no training set points between the hyperplanes, and thus the distance between the hyperplanes is maximized. The width of the strip between the hyperplanes is calculated as:

$$\frac{2}{\|w\|}.$$

Therefore, the task comprises minimizing the norm $\|w\|$, on the condition of excluding all points from the strip between the hyperplanes: $c_i(wx_i-b) \geq 1$, $1 \leq i \leq n$. In accordance with the Kuhn-Tucker theorem, the task is equivalent to the dual problem of searching for the saddle point of the Lagrangian function. As a result of solving the dual problem, it is possible to find the dual variables vector $\lambda=(\lambda_i, \ldots, \lambda_n)$. Then, $w=\Sigma_{i=1}^n \lambda_i c_i x_i$, $b=wx_i-c_i$, $\lambda>0$. The classification algorithm can be written in the following form:

$$a(x)=\text{sign}(\Sigma_{i=1}^n \lambda_i c_i x_i \cdot x - b).$$

Accordingly, if a(x)=1, then the x object is attributed to the first class; otherwise, the x object is attributed to the second class.

In embodiments, a support vector machine is used to divide antivirus records between classes 800 and 802. As described herein, an antivirus record that includes a false activation belongs to first class 800 and an antivirus record that identifies a malicious file belongs to second class 802. As x attributes, it is possible to use antivirus record parameters and statistical functions of the training set, as described above. For example, as x attributes, it is possible to use the sample mean ($x_1$) and the sample variance ($x_2$). Then, the training set will include n antivirus records. For each antivirus record, attribute values $x_i(x_1,x_2)$, and that the record belong to the $c_i$ class are known. The $c_i$ class is "1" if the antivirus record identifies a false activation, and is "−1" if the antivirus record identifies a malicious file. In accordance with the above-described support vector machine method, a dividing hyperplane wx−b=0 can be built, and each new antivirus record with they attribute vector can be classified as belonging to class 800 of antivirus records with false activation, if it is located above the dividing hyperplane: wy−b≥0. Otherwise, the new antivirus record y will be classified as belonging to class 802 of antivirus records that identify a malicious file.

It is noted that FIG. 8 illustrates only one example support vector machine method classification. However, modifications to such algorithms can also be implemented. For example, if a training set is not linearly separable, the co-called "outlying cases" can be excluded, or a non-linear classifier can be built on the basis of transition from a dot product to arbitrary kernels, which allow for the building of non-linear separators, etc.

Logistic regression can also be used as the classification algorithm in an embodiment. In such an embodiment, an antivirus record class (false activation or malicious file) acts as the regressand, while attributes, for example, the sample mean and the sample variance, act as dependent variables. Other embodiments can utilize a Bayesian classifier, a neural network, or other classification methods.

The activation statistics of the antivirus record can be presented as a time series. In an embodiment, processing tool 410 can apply various transformations to the time series of antivirus records prior to training the classification algorithm. These can include, for example, scaling (normalization), trend removal, noise removal, and other transformations allowing for a higher quality analysis.

In one embodiment, the classification attributes can be obtained from mathematical transformations on activation statistics of antivirus records using processing tool 410. Such transformations can be, for example, a discrete wavelet transform or a discrete Fourier transform. For example, the sum of squares of the wavelet transform and the difference between the maximal one and the minimal one among the wavelet coefficients can be used as attributes for a discrete wavelet transform.

Figure 9:
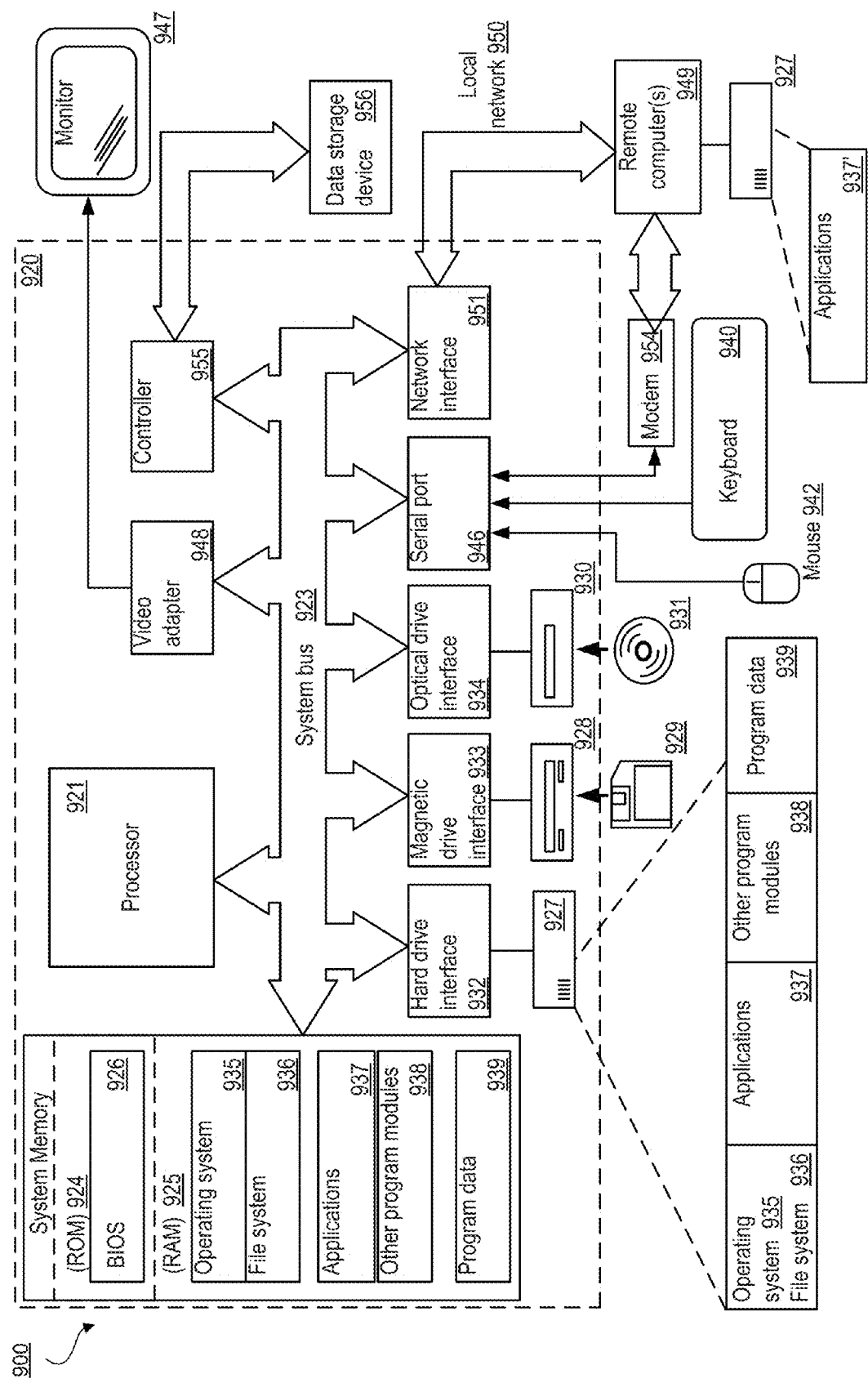
FIG. 9 is a block diagram of a computer system on which various engines can carry out a function or set of functions of the instant invention, according to embodiments.

FIG. 9 is a diagram illustrating in greater detail a computer system 900 on which aspects of the invention as described herein may be implemented according to various embodiments.

The computer system 900 can comprise a computing device such as a personal computer 920 includes one or more processing units 921, a system memory 922 and a system bus 923, which contains various system components, including a memory connected with the one or more processing units 921. In various embodiments, the processing units 921 can include multiple logical cores that are able to process information stored on computer readable media. The system bus 923 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 924 or volatile memory such as Random Access Memory (RAM) 925. The Basic Input/Output System (BIOS) 926 contains basic procedures ensuring transfer of information between the elements of personal computer 920, for example, during the operating system boot using ROM 924.

Personal computer 920, in turn, has a hard drive 927 for data reading and writing, a magnetic disk drive 928 for reading and writing on removable magnetic disks 929, and an optical drive 930 for reading and writing on removable optical disks 931, such as CD-ROM, DVD-ROM and other optical media. The hard drive 927, the magnetic drive 928, and the optical drive 930 are connected with system bus 923 through a hard drive interface 932, a magnetic drive interface 933 and an optical drive interface 934, respectively. The drives and the corresponding computer information media represent energy-independent means for storage of computer instructions, data structures, program modules and other data on personal computer 920.

The system depicted includes hard drive 927, a removable magnetic drive 929 and a removable optical drive 930, but it should be understood that it is possible to use other types of computer media, capable of storing data in a computer-readable form (solid state drives, flash memory cards, digital disks, random-access memory (RAM), etc.), connected to system bus 923 through a controller 955.

The computer 920 comprises a file system 936, where the recorded operating system 935 is stored, as well as additional program applications 937, other program engines 938 and program data 939. The user can input commands and information into the personal computer 920 using input devices (keyboard 940, mouse 942). Other input devices (not shown) can also be used, such as: a microphone, a joystick, a game console, a scanner, etc. Such input devices are usually connected to the computer system 920 through a serial port 946, which, in turn, is connected to a system bus, but they can also be connected in a different way—for example, using a parallel port, a game port or a Universal Serial Bus (USB). The monitor 947 or another type of display device is also connected to system bus 923 through an interface, such as a video adapter 948. In addition to monitor 947, personal computer 920 can be equipped with other peripheral output devices (not shown), such as speakers, a printer, etc.

Personal computer 920 is able to work in a network environment; in this case, it uses a network connection with one or several other remote computers 949. Remote computer(s) 949 is (are) similar personal computers or servers, which have most or all of the above elements, noted earlier when describing the substance of personal computer 920 shown in FIG. 9. The computing network can also have other devices, such as routers, network stations, peering devices or other network nodes.

Network connections can constitute a Local Area Network (LAN) 950 and a World Area Network (WAN). Such networks are used in corporate computer networks or in corporate intranets, and usually have access to the Internet. In LAN or WAN networks, personal computer 920 is connected to the Local Area Network 950 through a network adapter or a network interface 951. When using networks, personal computer 920 can use a modem 954 or other means for connection to a world area network, such as the Internet. Modem 954, which is an internal or an external device, is connected to system bus 923 through serial port 946. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method for managing antivirus records, the method comprising: providing a data store of antivirus records;
   providing an antivirus application to be executed on each of a plurality of user computers, each antivirus application configured to access the data store and at least one antivirus record, wherein the antivirus application is further configured to detect a malicious software file for antivirus records having a test status and detect and contain a malicious software file for antivirus records having a working status; and
   executing instructions by a remote server, the remote server including computing hardware of at least one processor, a memory operably coupled to the at least one processor and configured to store instructions invoked by the at least one processor, an operating system implemented on the computing hardware, and input/output facilities, cause the remote server to implement:
   a processing tool configured to:
   collect at least one antivirus record parameter for a particular antivirus record from the plurality of user computers, the antivirus record having a working status after occurrence of the detection event of the antivirus record on one of the plurality of user computers, wherein each detection event is associated with the antivirus record,
   collect statistical data of the detection events of the antivirus record from the plurality of user computers, and
   determine whether a total number of user computers on which the detection event of the antivirus record occurred over a predetermined period of time exceeds a detection threshold, wherein the detection threshold is based on the at least one antivirus record parameter, and
   a classification tool configured to:
   determine, when the total number of user computers on which the detection event of the antivirus record occurred exceeds the detection threshold, whether the antivirus record contains a false activation by at least one classification algorithm comprising a support vector machine operating on antivirus records in attribute space using the at least one antivirus record parameter and statistical data of the detection event, wherein the support vector machine generates a linear separation of antivirus records with a hyperplane based on a training set of antivirus records, wherein a first class grouping of the attribute space define false activation antivirus records and a second class grouping of the attribute space discrete from the first class grouping define malicious antivirus records, and change the status of the antivirus record from working status to test status, wherein the processing tool is further configured to receive the changed status of the antivirus record from the classification tool and distribute the changed status to the data store.

2. The method for managing antivirus records of claim 1, wherein the classification tool is further configured to build a classification algorithm using a training set for which the first class and the second class are predetermined, wherein processing tool is further configured to send training set to the plurality of user computers, and collect the at least one antivirus record parameter and the statistical data of the detection events of antivirus record for the training set for a predetermined collection period.

3. The method for managing antivirus records of claim 1, wherein the antivirus application comprises a plurality of security modules, and wherein the at least one antivirus record parameter includes a weight based on the particular security module corresponding to the antivirus record activated for the software file.

4. The method for managing antivirus records of claim 3, wherein at least two security modules corresponding to at least for two antivirus records detected the software file, and wherein the at least one classification algorithm considers the false activation to decrease.

5. The method for managing antivirus records of claim 1, wherein the antivirus record parameter includes at least one of:
  a timestamp of occurrence of detection event of the antivirus record,
  a name of the software file which was detected by the antivirus record,
  a path to the software file,
  a type of antivirus record including at least one of signature, heuristics, or parental control tool,
  a type of user application, or
  a location of the user computer.

6. The method for managing antivirus records of claim 1, wherein the at least one classification algorithm includes at least one of a support vector machine, a Bayesian classifier, a neural network, or a logistic regression.

7. The method for managing antivirus records of claim 1, wherein statistical data of the detection events of the antivirus record is analyzed by the classification algorithm according to at least one of a statistical function, a moment, a sampling moment, an autocorrelation of coefficients, a trend, a probability distribution, a seasonality component, or a period of seasonality component.

8. The method for managing antivirus records of claim 1, wherein the statistical data of the detection events of the antivirus record includes a weight based on at least one of an antivirus application type and an antivirus record type.

9. The method for managing antivirus records of claim 1, wherein the hyperplane is the vector $wx-b=0$, wherein $wx$ is the dot product of vectors $w$ and $x$, and $b$ is at least one antivirus record parameter, and hyperplanes $wx-b=1$ and $wx-b=-1$ are selected that intersect support vectors of the first class and the second class and are parallel to the hyperplane.

10. The method for managing antivirus records of claim 1, wherein the data store is provided on the remote server.

11. The method for managing antivirus records of claim 1, wherein the data store is provided on each of the plurality of user computers.

12. A system for managing antivirus records, the system comprising: a data store of antivirus records; and
  a remote server including computing hardware of at least one processor, a memory operably coupled to the at least one processor and configured to store instructions invoked by the at least one processor, an operating system implemented on the computing hardware, and input/output facilities, wherein the remote server is configured to implement: a processing tool configured to:
  collect at least one antivirus record parameter for a particular antivirus record from a plurality of user computers, each of the plurality of user computers executing an antivirus application, wherein the antivirus application is configured to access the data store and at least one antivirus record, wherein the antivirus application is further configured to detect a malicious software file for antivirus records having a test status and detect and contain a malicious software file for antivirus records having a working status, the antivirus record having a working status after occurrence of the detection event of the antivirus record on one of the plurality of user computers, wherein each detection event is associated with the antivirus record,
  collect statistical data of the detection events of the antivirus record from the plurality of user computers, and
  determine whether a total number of user computers on which the detection event of the antivirus record occurred over a predetermined period of time exceeds a detection threshold, wherein the detection threshold is based on the at least one antivirus record parameter, and
  a classification tool configured to:
  determine, when the total number of user computers on which the detection event of the antivirus record occurred exceeds the detection threshold, whether the antivirus record contains a false activation by at least one classification algorithm comprising a support vector machine operating on antivirus records in attribute space using the at least one antivirus record parameter and statistical data of the detection event, wherein the support vector machine generates a linear separation of antivirus records with a hyperplane based on a training set of antivirus records, wherein a first class grouping of the attribute space define false activation antivirus records and a second class grouping of the attribute space discrete from the first class grouping define malicious antivirus records, and
  change the status of the antivirus record from working status to test status, wherein the processing tool is further configured to receive the changed status of the antivirus record from the classification tool and distribute the changed status to the data store.

13. The system for managing antivirus records of claim 12, wherein the hyperplane is the vector $wx-b=0$, wherein $wx$ is the dot product of vectors $w$ and $x$, and $b$ is at least one antivirus record parameter, and hyperplanes $wx-b=1$ and $wx-b=-1$ are selected that intersect support vectors of the first class and the second class and are parallel to the hyperplane.

14. A method for managing antivirus records, the method comprising:

gathering at least one antivirus record parameter for a particular antivirus record utilized on a user device, the antivirus record being utilized to detect a malicious software file for antivirus records having a test status and detect and contain a malicious software file for antivirus records having a working status;

gathering at least one statistical measure after the occurrence of a malicious software file detection event on the user device for a particular antivirus record, the malicious software file detection event activating the antivirus record; determining a total number of user devices on which the antivirus record was activated over a predetermined period of time;

determining whether the total number of user devices on which the antivirus record was activated exceeds a predetermined device threshold, wherein the predetermined device threshold is based on the at least one antivirus record parameter;

determining, when the total number of user devices exceeds the device threshold, whether the antivirus record contains a false activation by a classification algorithm comprising a support vector machine operating on antivirus records in attribute space that utilizes the at least one antivirus record parameter and the at least one statistical measure, wherein the support vector machine generates a linear separation of antivirus records with a hyperplane based on a training set of antivirus records, wherein a first class grouping of the attribute space define false activation antivirus records and a second class grouping of the attribute space discrete from the first class grouping define malicious antivirus records; and updating the status of the antivirus record from working status to test status if the classification algorithm determines the antivirus record contains a false activation.

15. The method for managing antivirus records of claim 14, further comprising communicating the updated status of the antivirus record to the user device.

* * * * *